United States Patent [19]

Chang

[11] 4,364,966

[45] Dec. 21, 1982

[54] BLENDS OF EGG ALBUMEN AND WHEY PROTEIN HAVING IMPROVED GEL STRENGTH

[75] Inventor: Pei K. Chang, Montrose, N.Y.

[73] Assignee: Nutrisearch Company, Cincinnati, Ohio

[21] Appl. No.: 253,967

[22] Filed: Apr. 13, 1981

[51] Int. Cl.$^3$ .......................... A23C 21/04; A23J 3/00; A23L 1/32

[52] U.S. Cl. .................................... 426/573; 426/583; 426/614; 426/657

[58] Field of Search ................ 426/583, 573, 614, 657

[56] References Cited

U.S. PATENT DOCUMENTS

| | | | |
|---|---|---|---|
| 2,982,663 | 5/1961 | Bergquist | 426/32 |
| 3,143,427 | 8/1964 | Thies | 426/583 X |
| 3,161,527 | 12/1964 | Smith | 426/32 |
| 3,737,326 | 6/1973 | Basso et al. | 426/583 |
| 4,214,010 | 7/1980 | Corbett | 426/583 X |

Primary Examiner—Robert A. Yoncoskie
Attorney, Agent, or Firm—Cushman, Darby & Cushman

[57] ABSTRACT

A dried blend of egg albumen and whey protein-containing composition which exhibits improved gel strength is prepared by subjecting desugared dried egg albumen to a heat treatment for a period of time ranging from in excess of about 2 weeks to about 8 weeks beyond the time the heat history of the dry egg albumen has remained above about 55° C. said period of time being sufficient to elevate the gel strength of the egg albumen above 250 grams over the gel strength of the egg albumen prior to pasteurization, the blending from about 50% to about 85% of said so treated egg albumen with at least 15% of a whey protein-containing composition having from about 35% to about 80% whey protein.

11 Claims, No Drawings

BLENDS OF EGG ALBUMEN AND WHEY PROTEIN HAVING IMPROVED GEL STRENGTH

The present invention relates to dry blends of egg albumen and whey proteins which evidence improved gel strength and processes for preparing the same.

BACKGROUND OF THE PRESENT INVENTION

Dried egg albumen is a well known commercial product. Albumen, after separation from yolk, is subjected to a desugaring step to avoid browning upon drying. Desugaring is generally accomplished by treating egg albumen with bacteria such as Enterobacter Aerogenes which consume the glucose in the egg. The desugared egg albumen is then dried such as by pan drying or spray drying. The details are more fully set forth in the Science and Technology of Egg Products Manufactured in the United States, Forsythe R. (1968) (publisher).

Since it is well known that egg albumen is a perfect breeding ground for various bacteria including the highly toxic salmonella, the product must be pasteurized before distribution and sale. One of the effective pasteurization means is termed "Hot Room Treatment". In this treatment the dried egg albumen in closed containers is placed in a clean sealed room, the containers being spaced sufficiently to assure adequate heat penetration and air circulation. Spray dried albumen is heated throughout to a temperature of not less than 130° F. and held continuously at such temperature for not less than five days and until it is salmonella negative. Pan dried albumen is heated throughout to a temperature of not less than 125° F. and held continuously at such temperature for not less than five days and until salmonella negative. This is set forth in the U.S. Department of Agriculture regulations governing the inspection of eggs and egg products (7 CFR 59.575). An average treatment time is two weeks.

Much experimental work has been conducted to determine the effect of this type of pasteurization on the content of salmonella and the functional properties of the egg albumen. In the article entitled "The Effect of High-Temperature Storage on the Content of Salmonella and on the Functional Properties of Dried Egg White" by G. J. Banwart and J. C. Ayres, Food Technology 10:68-73, it is indicated that albumen containing 1.5, 3 or 6% moisture stored for 150, 120 and 90 days respectively at 50° C. provided good salmonella control without any significant loss in the volume of angel cakes. Albumen with 12% moisture showed a significant decrease in the volume of resulting angel cakes when stored for three days. Of similar import are the papers entitled "High Temperature Storage of Spray-Dried Egg White", No. 1, Whipping Time and Quality of Angel Cake, by R. E. Baldwin et al., Poultry Science 46:1421-1430; "High Temperature Storage of Spray-Dried Egg White", No. 2, Electrophoretic Mobility, Conalbumen-Iron Complexing, Sulfhydryl Activity, and Evolution of Volatile Bases, by O. J. Cotterill, Poultry Science 46:1431-1437; "Spray Drying of Egg White at Various pH Levels" by W. M. Hill, Poultry Science 44:1155-1163 and "High Temperature Storage of Spray-Dried Egg White" by L. E. McBee et al., Poultry Science: 50, No. 2 pages 452-458.

It is also well known to prepare various products from whey, the by-product of cheese manufacture. The products that can be obtained from whey include, among others, a whey protein concentrate. Whey protein concentrates can be made by numerous methods including gel fractionation (U.S. Pat. No. Re. 27,806) as well as by ultrafiltration. An illustrative method for ultrafiltration is described by Horton, B. S. et al., Food Technology, Volume 26, page 30 (1972). Whey protein concentrate generally has about 35% to about 80% protein. One of the proteins in the whey protein concentrate is a water soluble protein of the albumenoid class of proteins. Because some of the protein in whey protein concentrate is from the same class as that of egg albumen, workers thought that one of the obvious areas of use of this lower cost protein would be in extending egg albumen. Various workers have attempted to substitute whey protein concentrate for egg albumen in various recipes. Depending on the functionality for which the eggs were used, the richness in eggs of the recipe and the type of whey protein concentrate used, sucesses have been sporadic. In attempting to make a hard-whipped meringue, whey protein concentrate from ultrafiltration is not entirely satisfactory. In general, the critical test for the substitution is the preparation of angel cake and it is not known whether or not any whey protein can be used as a substitute for egg albumen whether alone or partially (around 50%). Various prior processes for preparing "egg white substitutes" are disclosed in the prior art discussion in U.S. Pat. No. 4,089,987. In general, the replacements on a functional basis cannot be accomplished without the addition of secondary ingredients such as carboxymethylcellulose or the materials disclosed in U.S. Pat. No. 4,089,987. In the past blends of egg albumen and whey protein concentrate have been made in a recipe by partially replacing egg albumen. This is generally accomplished using either liquid or dried egg albumen and a whey protein concentrate.

One of the unique properties of egg albumen is its ability to form a stable gel at a relatively low temperature. A 15% solution of a desugared spray-dried egg albumen which has been hot room treated as standard in the industry will provide a gel by heating the solution to a temperature of about 70° C. for about 30 minutes. It is also possible to gel a whey protein concentrate by heating a solution of 15% whey protein for 30 minutes at 85° C. Relative gel strengths for the respective products are about 90 grams and 450 grams respectively as tested with a penetrometer. In attempting to provide blends of egg albumen and whey protein concentrate for use as gel forming material, it was discovered that the gels provided by the blends are weaker than that provided by the weakest component used alone. The same result is achieved when the whey protein concentrate is mixed with the egg and then hot room treated or if the whey protein concentrate is hot room treated prior to it mixing with the spray-dried egg white. In both cases the product would brown and be unacceptable. These findings severely limit the use of whey protein concentrate as a blend with egg albumen in areas where the gelling function of the egg albumen is of significance.

BRIEF SUMMARY OF THE INVENTION

My invention includes a dry blend of a pasteurized egg albumen and a whey protein composition which blend exhibits improved gel strength. The blend is made from about 50% to about 85% of a pasteurized desugared egg albumen together with a whey protein-containing composition. Preferably the ratio of treated egg albumin to whey protein composition ranges from about 75:25 to about 50:50 and most preferably the amount of pasteurized heat treated egg albumen is about 75% balance whey protein composition. The egg albumen which has been pasteurized and desugared and is subjected to a further heat treatment at temperatures ranging from about 55° C. to about 65° C. for a period ranging from above about 2 weeks to about 8 weeks beyond the time the heat history of the dry egg albumen has remained above about 60° C. The dry egg albumen is mixed with a whey protein-containing composition consisting from about 50% to 100% by weight of a whey protein concentrate derived by ultrafiltration of whey, the concentrate having from about 40% to about 60% protein and optionally from 50% to 0% of another dairy-protein-containing product as described hereinafter. Processes for producing this dry blend are also disclosed.

In accordance with the present invention, it has been found that the gel strength of blends of whey containing materials and dried egg albumen at temperatures below 85° C. in a 15% solution for 30 minutes can be improved by subjecting desugared dried pasteurized egg albumen to treatment in the hot room for a period of time ranging from above about two weeks to about eight weeks counting beyond the time the heat history of the egg albumen has been above about 55° C. This includes any pasteurization procedure in the hot room. Preferably, the hot room treatment is conducted for a period of time of about three to about six weeks and more preferably about five weeks±0.5 weeks. This material when blended with the whey protein concentrate, provides a gel strength higher than the blend of the normal pasteurized egg albumen and thus sufficiently high to be commercially useful in the area of blends of whey protein and egg albumen for functional gelation uses. Whey protein concentrate can be prepared by various processes which include post treatments as will be explained more fully hereinafter.

DETAILED DESCRIPTION OF THE PRESENT INVENTION

The present invention relates to dried blends of dried egg albumen and dried whey protein material. Any commercially available dried egg albumen is effectively usable in the present invention. Preferably, the dried egg albumen is prepared by the standard process which includes desugaring of the egg albumen, pan or spray drying followed by a sufficient hot room treatment to effect salmonella control. Procedures for preparing this type of material are well known in the industry and have been described hereinbefore.

In accordance with this invention, the dried egg albumen is required to be subjected to treatment under heat for a period of time ranging above about two weeks (at least 15 days) to about eight weeks, the time including any heat treatment used for pasteurization. In general, the apparatus and conditions used for hot room treatment pasteurization are also effective in treatment of the egg albumen for purposes of the invention. The dried egg albumen can be purchased commercially and then subjected to a heat treatment or the egg albumen can be subjected to a complete heat treatment for the entire period without a cool down period in between. In either case, the egg albumen as obtained will effectively provide, when combined with the whey protein concentrate, a product of a gel strength superior to that of a blend of a whey protein concentrate and a pasteurized dried egg algumen without extended heat treatment.

The amount of heating depends on the time the dried product has been heated above 55° C. The heat history is not intended to include the heat needed for drying. Thus, the dry egg albumen can be heated above 55° C. for the pasteurization period, cooled down and reheated or the dry egg albumen can be heated continuously for a period sufficient to pasteurize and heat treat in accordance with the invention. The heat treatment must be sufficiently long at the temperature used to raise the gel strength above about 250 grams over the gel strength of the dried egg albumen prior to pasteurization. Higher temperatures provide higher gel strengths. In other words, equivalent gels strength can be reached in shorter time using higher temperature than using lower temperature and longer time. It is preferred that the heating temperatures range from about 55° C. to about 65° C. Extended heating (beyond eight weeks) has not been found to provide any beneficial results.

The whey protein containing composition for use in the present invention preferably contains from about 35% to about 80% dairy derived protein on a dry solids basis. Of that dairy derived protein, at least 50%, preferably at least 75%, more preferably at least 90% and most preferably 100% of the protein is whey protein. The whey protein is generally provided by a whey protein concentrate (at least 35% protein). On a solids basis, the whey protein-containing composition is preferably comprised of at least 50% and preferably from about 75% to about 100% of a whey protein concentrate having at least 35% protein, from 50% to about 0% and preferably from 25% to about 0% of another dairy protein-containing composition including other whey protein-containing compositions.

The whey protein concentrate as well as other whey protein-containing products used in the present invention can be derived from cheese whey, casein whey and soy whey and preferably cheese whey. Cheese whey is the by-product of the acid or rennet coagulation of protein (casein) from milk.

Sweet whey or cheddar whey is obtained by the separation and removal of coagulated casein produced by the addition of a proteolytic enzyme to milk. The proteolytic enzymes generally used are known as rennin and/or pepsin. Specific examples of cheese products produced by this method include cheddar cheese, swiss cheese and mozzarella.

Acid or cottage cheese whey is the by-product obtained from the acid coagulation of milk protein by the use of lactic acid producing bacteria (e.g., *lactobacillus*) or by the addition of food grade acids such as lactic or hydrochloric acid, i.e., direct acidification. In either case, acidification is allowed to proceed until a pH of approximately 4.6 is reached. At this pH, casein becomes insolubilized and coagulates as cheese curd.

The whey protein concentrate as used in the invention can be derived from 100% acid cheese whey though minor amounts of other cheese wheys of less than 50% and preferably less than 20% can be utilized. Such other cheese wheys include but are not limited to cheddar cheese whey.

The whey protein concentrate used in the invention can be prepared by any one of a number of known processes including electrodialysis (Stribley, R. C., Food Processing, Column 24, No. 1, page 49, 1963), reverse osmosis, (Marshall, P. G. et al., Fractionation and Concentration of Whey by Reverse Osmosis, Food Technology, 22(a), 696, 1968), gel filtration (U.S. Pat. No. Re. 27,806); or by ultrafiltration (Horton, B. S. et al., Food Technology, Volume 26, page 30, 1972). Chemical methods including the phosphate precipitation of whey protein can also be used as described in Gordon U.S. Pat. No. 2,388,624 and Melachouris U.S. Pat. No. 4,043,990. Products such as lactalbumen phosphate are also to be considered whey protein concentrates. The disclosures of the foregoing articles and patents are incorporated herein by reference. The whey protein concentrate should contain at least 35% protein based on total Kjeldahl nitrogen.

For example, an ultrafiltered acid (cottage cheese) whey concentrate containing from about 40% to about 60% and preferably about 45% to about 55% whey protein can be used in the invention. In a typical process, cottage cheese whey is neutralized to a pH of about 6.4 with 50% caustic. After storage, the pH is then adjusted to about 7.2 and any solids or precipitates are removed by centrifugal clarifiers. The clarified liquor is then pasteurized. The liquor is then fed into an ultrafiltration membrane unit. The retentate is condensed and spray dried. Protein products containing 35% or more whey protein can be prepared by this process. Products generally comprising from about 40% to about 60% protein (TKN×6.38), 10–30% lactose, 3–15% ash, and 0.1–4% fat are obtained. The dried retentate with the aforegiven composition is considered a whey protein concentrate. While it is preferred to use the whey protein concentrate in the dry form, the liquid form can also be used on a percent by weight solids basis, when blending of the whey protein concentrate and the dry heat treated albumen is accomplished during the formulation of the final product in which the blend is used. Liquid levels in the final formulation are adjusted to the correct solid/liquid ratio. Liquid whey protein concentrate must be kept under refrigeration to prevent spoilage.

The whey protein concentrate can also be combined with another protein-containing whey based product such as dried whey, delactosed whey, delactosed/demineralized whey where demineralization is accomplished by any known method such as electrodialysis, ion exchange or material transfer (ultrafiltration, reverse osmosis), as well as the dried mother liquor (clarified whey) remaining after separation of the precipitates prepared in accordance with U.S. Pat. Nos. 3,560,219 and 4,036,999, the disclosures of which are incorporated herein by reference.

Other non-whey based dairy protein compositions which can be used include milk and milk solids, e.g. NFDM, casein and caseinates including sodium, potassium and calcium caseinate.

The whey protein concentrate can also be post treated after separation to vary the properties of the composition. Specifically, the thermal gellation temperature of the whey protein concentrate can be reduced by an alkaline heat treatment such as disclosed in Ser. No. 187,352 filed Sept. 24, 1980. In this process a whey protein concentrate has its pH elevated to within the range of 8 to 10 and preferably around 9 to 9.5 and is heated within the range of from about 70° to about 77.5° C. preferably from about 72.5° to about 75° C. and immediately cooled down such that the heating is maintained for no longer then about 60 and preferably 15 seconds. The pH can be adjusted down to neutral as desired.

The strength of the gels prepared with the blends depends on the quantity of egg albumen replaced. As the quantity of egg albumen in the blend decreases so does the strength of the gels provided. Effective results have been found utilizing from about 50% to about 85% egg albumen and conversely at least about 15% whey protein concentrate and preferably from about 50% to about 15% whey protein concentrate with about 75% egg albumen and about 25% whey protein concentrate being more preferred.

The blends of the present invention can be made by dry blending the ingredients and selling the blend. If the blend is to be used as part of a dry mix for preparing a food, the blending can be accomplished during preparation of the mix. The two separate components of the blend can also be added during the preparation of the food in which the blend is to be used. Blending can be conducted on the dry materials or reliquified materials. Only the egg albumen must be processed to a dry stage at some time during its processing history.

The products of the present invention can be used in any area where the gellation properties of egg elbumen are significant. These include binding comminuted meat and fish. It is to be noted that the process of the present invention is particularly significant in providing effective gels at the lowest possible gellation temperatures to save on energy costs as well as not consuming excess time. The higher the gellation temperature used in preparing the gels the less distinction is seen between compositions.

The invention will be more fully illustrated in the examples which follow.

EXAMPLE 1

Commercially available desugared dried egg albumen which had received two weeks of heat treatment at 60° C. was subjected to additional heat treatment for various periods of time. A 2.25 kilo package of commercial pasteurized dried egg albumen was placed in an oven at 55° C. Samples were removed from the box at various periods of time. The gel strength of blends of 75% egg albumen and 25% whey protein concentrate which had been heated in a 16.5% solution at a pH of 8.7 to a temperature of 75.5° C. for 16 seconds, cooled and neutralized were determined. Gel conditions are given in table, heating time was thirty minutes. The gelation test involved dissolving the test protein in an appropriate quantity of water to obtain the desired percent total solids or percent total protein. The product of the invention and the control were tested in solutions containing 10–15% total solids and about 7–10% protein. The pH of the solution was adjusted to 7.0 with a minimum amount of acid (HCl) or base (NaOH). Thirty-five grams of solution was weighed into a 35 cm×45 cm diameter glass dish. The dish was covered with plastic film and a watch glass. The glass dish was lowered into a hot water bath for thirty minutes, from the time the dish was placed into the bath. After thirty minutes, the dish was placed in a refrigerator immediately after heating and held overnight. The gel strength is determined by allowing the temperature of the gel to reach room temperature (25° C., a water bath can be used for this purpose) and then inverting the gel on the scale of a Marine Colloids gel tester (slow speed and small plunger). The amount of force in grams required to break the center of the gel is then determined. The results are shown in the following table:

TABLE 1

| Extra Storage Time | Gel Strength - grams | |
|---|---|---|
| | 70° C./15% T.S. | 90° C./10% T.S. |
| 0 weeks | 20 | 120 |
| 1 | 128 | 135 |
| 2 | 125 | 145 |
| 3 | 243 | 185 |
| 4 | 240 | 200 |
| 5 | 245 | 220 |
| Commercial Egg Albumen alone* | 90 | 180 |
| Whey Protein Concentrate* alone | 163 | — |

*Experiments run at different times than experiments providing the main data for the Table.

As can be seen from the data, a blend of commercial dried egg albumen pasteurized for two weeks in a hot room and whey protein concentrate provided gel strength at 70° C. of 20 whereas commercial pasteurized egg albumen alone provided a gel strength of 90 and whey protein concentrate a gel strength of 163. Blends of commercial dried egg albumen and whey protein concentrate provide gel strengths lower than either ingredient alone. By the process of the invention, it is possible to provide blends which equal and even surpass the gel strength of the component providing the greatest gel strength.

EXAMPLE 2

Various whey protein concentrates were used with various lots of commercially heat treated desugared dried egg albumen. Heat treatment of the egg albumen was conducted under plant conditions of 60° C. for a total of four or five weeks (2-3 weeks extra). The following results were obtained using a 75% dried egg albumen, 25% whey protein concentrate blend:

TABLE 2

Gel Strength of Blend of WPC and Egg Albumen with 5 weeks of Heat Treatment

| Egg Albumen Lot | 15%, 70° C. (As is) | 15%, 70° C. (75:25) WAPRO 50* | 10%, 90° C. (75:25) WAPRO 50* |
|---|---|---|---|
| 1 | 218 | 158 | 130 |
| 2 | 239 | 168 | 120 |
| 3 | 265 | 193 | 160 |
| 4 | 238 | 170 | 120 |
| 5 | 261 | 175 | 140 |
| 5 | 261 | (75:25) ENRPRO LGT** 120 | 160 |
| 5 | 261 | (75:25) ENRPRO 50*** 110 | 155 |

TABLE 3

Gel Strength of Blend of WPC and Egg Albumen with 5 Weeks of Heat Treatment

| Egg Albumen Lot | 15%, 70° C. (As is) | 15%, 70° C. (75:25) WAPRO 50* | 10%, 90° C. (75:25) WAPRO 50* |
|---|---|---|---|
| 6 | 295 | 210 | 160 |
| 7 | 280 | 190 | 155 |
| 8 | 330 | 210 | 173 |
| 9 | 305 | 195 | 163 |
| 9 | 305 | (75:25) ENRPRO LGT** 170 | (75:25) ENRPRO 50*** 235 |

Footnotes for Tables 2 and 3
Gel strength of commercial pasteurized (2 weeks) desugared dried egg albumen: 95 gm. (70° C.), 160 gm. (90° C.)
*Ultrafiltered sweet whey
**Ultrafiltered acid whey heated to 75.5° C. at pH 8.7 for 16 seconds, cooled, and neutralized.
***Ultrafiltered acid whey

EXAMPLE 3

Blends of 75% commercially available egg albumen heat treated for an additional five weeks as outlined in the preceding example and 25% of various whey protein concentrate products were prepared with the following results:

TABLE 4

| Whey Protein Concentrate | % Protein | Gel Strength - grams 70° C./15% T.S. |
|---|---|---|
| ENRPRO 50 | 50 | 235 |
| ENRPRO LGT Lot 1 | 50 | 245 |
| Lot 2 | 50 | 315 |
| Wapro 50 | 50 | 340 |
| Wapro 35 | 35 | 240 |
| Foretein 35 | 35 | 255 |
| Na-Protolac | 55–60 | 265 |
| Amberpro | 65 | 245 |
| Lacto Albumen | 73 | 400 |
| Lacto Albumen | 71 | 285 |
| Hi Sorb Conc | — | 335 |
| Na Caseinate | 90 | 335 |
| N.F.D.M. | 35 | 300 |
| Solac Spec 80 | 80 | 430 |

TABLE 5

PROTEIN IDENTIFICATION TABLE*

| | | |
|---|---|---|
| 1. ENRPRO | Ultrafiltered WPC - 50% | |
| 2. ENRPRO LGT | See Footnote **, Table Y | |
| 3. Wapro 50 | Ultrafiltered WPC - 50% WP | |
| 4. Wapro 35 | Ultrafiltered WPC - 35% WP | |
| 5. Foretein 35 | Electrodialyzed Whey - 35% WP | |
| 6. Na Protolac | Phosphate precipitated protein - 55–60% WP | |
| 7. Amberpro | Heat denatured Ultrafiltered WPC | |
| 8. Lacto Albumen | New Zealand | |
| 9. Lacto Albumen | West Germany | |
| 10. High Sorb. Conc. | Partially delactosed Skim Milk | |
| 11. Na Caseinate | | |
| 12. N.F.D.M. | | |
| 13. Solac Spec 80 | Ultrafiltered WPC | |

*WPC—Whey Protein Concentrate
WP—Whey Protein

EXAMPLE 4

A sample of a whey protein concentrate obtained by concentrating the whey protein of an acid whey by ultrafiltration was stored in an oven in a plastic bag for various periods of time at 55° C. Samples were removed and color changes noted as follows:

TABLE 6

| Time - Days | Color | Gel Strength - grams 15% T.S./85° C./30 min. |
|---|---|---|
| 0 | sl. off white | 435 |
| 10 | light brown | 5 |
| 14 | medium brown | No gel - sample insoluble |
| 35 | dark brown | No gel - sample insoluble |

Hot room temperature is harmful to whey protein concentrate as the product browns, becomes insoluble.

What is claimed is:

1. A process for preparing a dried blend of a pasteurized egg albumen and whey protein-containing composition which exhibits improved gel strength, said dried blend comprising the steps of
    (1) subjecting desugared, dried pasteurized egg albumen to a heat treatment at a temperature ranging from about 55° C. to about 65° C. for a period of time ranging from in excess of about 2 weeks to about 8 weeks beyond the time of dry pasteurization of the dry egg albumen at above about 55° C., said period of time being sufficient to elevate the gel strength of the egg albumen above 250 grams over the gel strength of the egg albumen prior to pasteurization, and
    (2) blending from about 50% to about 85% of said so treated egg albumen with at least 15% of a whey protein-containing composition having from about 35% to about 80% whey protein.

2. The process as recited in claim 1 wherein said period of the heat treatment time ranges from about 3 weeks to about 6 weeks.

3. The process as recited in claim 2 wherein said whey protein concentrate is prepared by ultrafiltration.

4. The process as recited in claim 1 wherein the ratio of heat treated egg albumen to whey protein composition ranges from about 75:25 to about 50:50.

5. The process as recited in claim 1 wherein said egg albumen is heat treated for about 5 weeks±0.5 weeks.

6. A dried blend of pasteurized egg albumen and a whey protein-containing composition exhibiting improved gel strength, said dried blend comprising from about 50% to about 85% of a desugared dried pasteurized egg albumen which has been heat treated at a temperature ranging from about 55° C. to about 65° C. for a period ranging from above about 2 weeks to about 8 weeks beyond the time dry pasteurization of the dry egg albumen at above about 60° C. in combination with a whey protein-containing composition comprising:
    1. from about 50 to 100% by weight of a whey protein concentrate derived by ultrafiltration of whey, said concentrate having from about 40% to about 60% protein, and
    2. from about 50% to 0% of another dairy-protein-containing product selected from the group consisting of milk, milk solids, casein, sodium caseinate, potassium caseinate and calcium caseinate.

7. The composition as recited in claim 6 wherein said pasteurized heat treated egg albumen is used in an amount ranging from about 75% to about 50% and said whey protein-containing composition is used in an amount ranging from about 25% to about 50% by weight based on the combined weight of said albumen and said whey protein-containing composition.

8. The composition as recited in claim 6 wherein said heat treatment time period ranges from about 3 weeks to about 6 weeks.

9. The composition as recited in claim 6 or 7 wherein said whey protein-containing composition is a whey protein concentrate.

10. The composition as recited in claim 6 wherein said pasteurized egg albumen is heat treated for about 5 weeks±0.5 weeks at a temperature within the range of from about 55° C. to about 65° C.

11. The composition as recited in claim 7 wherein the amount of egg albumen is about 75% and said whey protein-containing composition is a whey protein concentrate.

* * * * *